United States Patent [19]
Takasaki et al.

[11] Patent Number: 5,752,211
[45] Date of Patent: May 12, 1998

[54] CONTROL SYSTEM FOR DISTRIBUTING DRIVE TORQUE BETWEEN FRONT AND REAR WHEELS OF VEHICLE

[75] Inventors: Toshiharu Takasaki, Sagamihara; Tomoyuki Hara, Hadano, both of Japan

[73] Assignee: Nissan Motor Co., Ltd., Yokohama, Japan

[21] Appl. No.: 649,475

[22] Filed: May 17, 1996

Related U.S. Application Data

[63] Continuation of Ser. No. 320,543, Oct. 11, 1994, abandoned.

[30] Foreign Application Priority Data

Nov. 24, 1993 [JP] Japan .................. 5-293652

[51] Int. Cl.$^6$ ............... G06F 7/70; G06G 7/76
[52] U.S. Cl. ............... 701/69; 701/75; 701/88; 180/197; 180/248; 180/233
[58] Field of Search ............... 364/426.01, 426.2, 364/426.03, 426.041, 426.04, 431.07, 424.1; 180/178, 233, 248, 247, 249, 197, 24, 24.09, 250; 192/60; 60/437; 475/86, 150, 89; 74/650; 477/36

[56] References Cited

U.S. PATENT DOCUMENTS

| | | | |
|---|---|---|---|
| 4,715,466 | 12/1987 | Ishii et al. | 180/233 |
| 4,754,834 | 7/1988 | Ozaki et al. | 180/233 |
| 4,773,500 | 9/1988 | Natio et al. | 180/233 |
| 4,792,009 | 12/1988 | Iritani | 180/233 |
| 4,809,807 | 3/1989 | Leiber | 180/197 |
| 4,846,298 | 7/1989 | Naito | 180/233 |
| 4,874,056 | 10/1989 | Naito | 180/233 |
| 4,887,689 | 12/1989 | Naito | 180/233 |
| 4,890,509 | 1/1990 | Hara | 180/197 |
| 4,974,163 | 11/1990 | Yasuno et al. | 364/426.02 |
| 4,986,388 | 1/1991 | Matsuda | 180/248 |
| 5,002,147 | 3/1991 | Tezuka et al. | 180/197 |
| 5,005,665 | 4/1991 | Kodama | 180/233 |
| 5,014,809 | 5/1991 | Matsuda | 364/426.035 |
| 5,019,985 | 5/1991 | Yasuno et al. | 364/426.02 |
| 5,032,995 | 7/1991 | Matsuda et al. | 364/424.03 |
| 5,060,747 | 10/1991 | Eto | 180/197 |
| 5,075,854 | 12/1991 | Imaseki et al. | 364/424.098 |
| 5,119,298 | 6/1992 | Naito | 364/426.02 |
| 5,126,942 | 6/1992 | Matsuda | 364/426.02 |
| 5,152,191 | 10/1992 | Sato et al. | 364/424.098 |
| 5,152,362 | 10/1992 | Naito | 180/248 |
| 5,183,131 | 2/1993 | Naito | 364/424.098 |
| 5,193,639 | 3/1993 | Hara et al. | 180/248 |
| 5,221,101 | 6/1993 | Okubo et al. | 180/247 |
| 5,251,719 | 10/1993 | Eto et al. | 180/197 |
| 5,275,252 | 1/1994 | Sperduti et al. | 180/197 |
| 5,282,518 | 2/1994 | Yamasaki et al. | 180/233 |
| 5,303,797 | 4/1994 | Niikura | 180/248 |
| 5,345,842 | 9/1994 | Kondo | 364/424.1 |
| 5,346,032 | 9/1994 | Sasaki | 364/424.098 |
| 5,375,461 | 12/1994 | Suzuki | 73/117 |
| 5,376,868 | 12/1994 | Toyoda et al. | 364/426.031 |
| 5,609,219 | 3/1997 | Watson et al. | 180/248 |

FOREIGN PATENT DOCUMENTS

| | | |
|---|---|---|
| 1-195126 | 8/1989 | Japan . |
| 1-204826 | 8/1989 | Japan . |

*Primary Examiner*—Jacques H. Louis-Jacques
*Attorney, Agent, or Firm*—Foley & Lardner

[57] ABSTRACT

In a control system for distributing a driving force from an engine between the front and rear wheels of a vehicle, a controller is designed to decrease the driving force transmitted to the secondary drive wheels which may be the front wheels by modifying a driving force distribution control characteristic when the vehicle is in a predetermined constant speed steady state, in order to improve the fuel economy in the steady state operation while maintaining a vivid vehicle response to a driver's accelerator input. Preferably, the controller determines an offset quantity L which has at least a cubic term proportional to the third power of a vehicle speed when the predetermined steady state exists, and increases the driving force to the secondary wheels as an excess of the wheel speed difference over the offset quantity increases from zero.

28 Claims, 6 Drawing Sheets

FIG.3
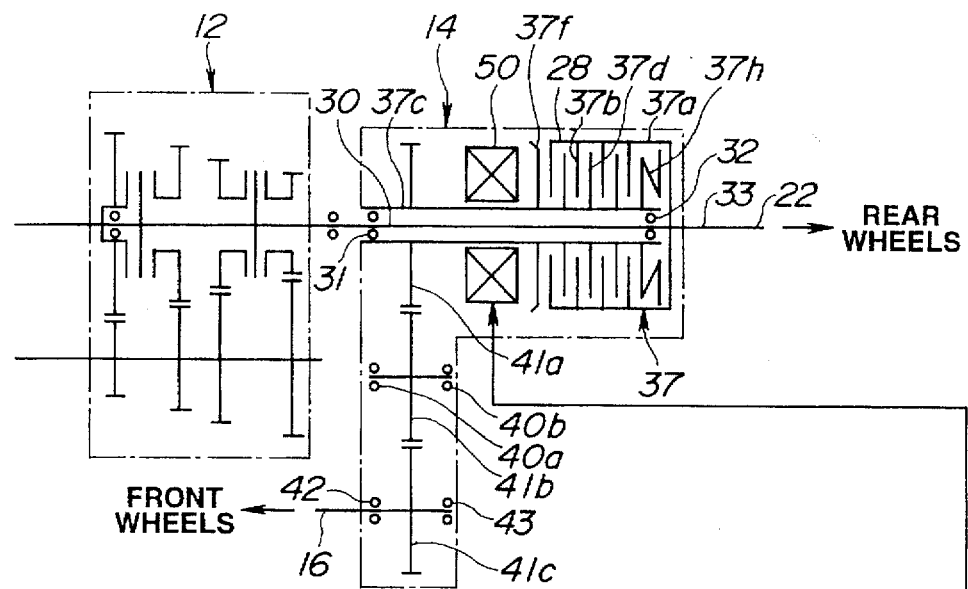
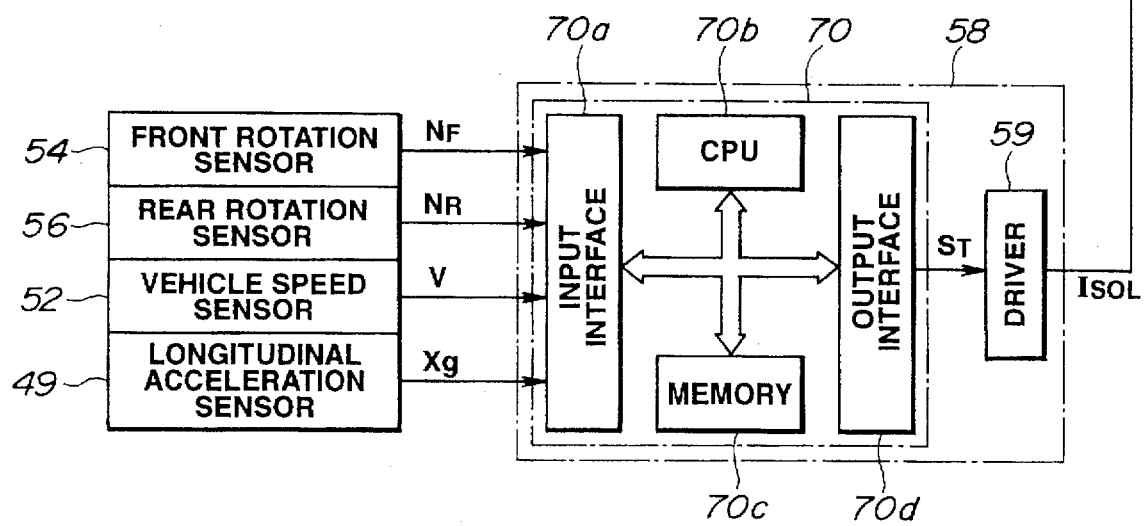

FIG.7
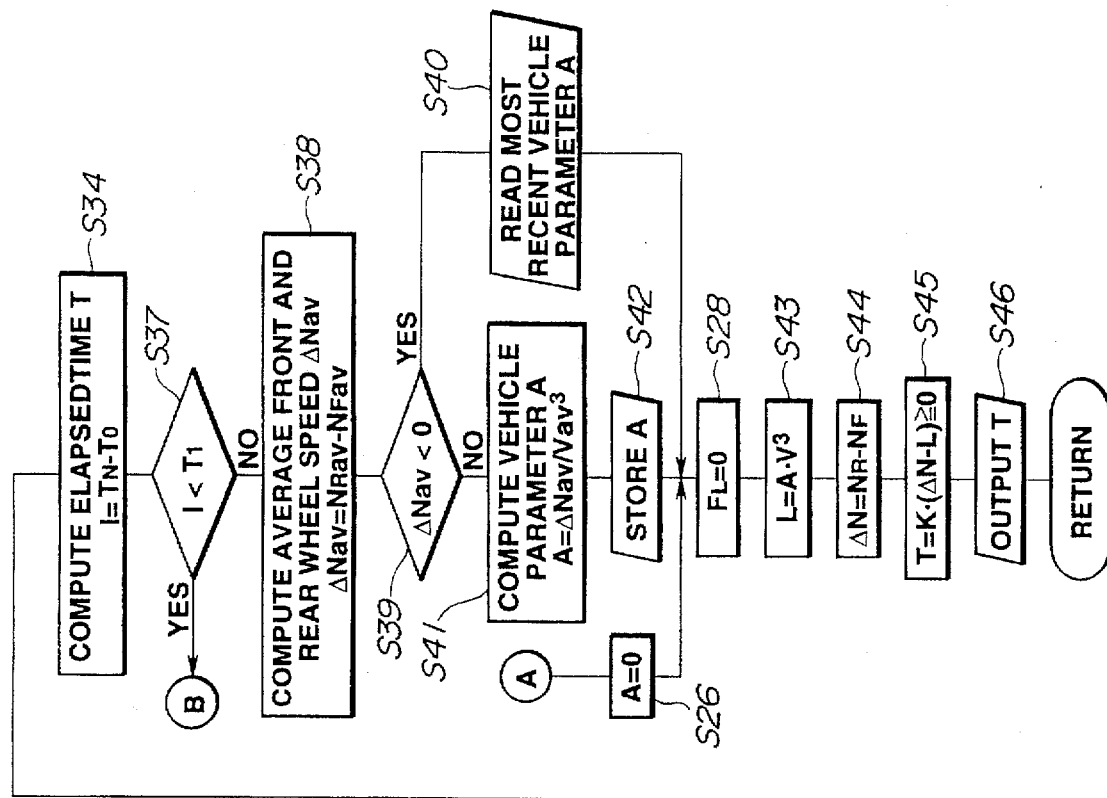
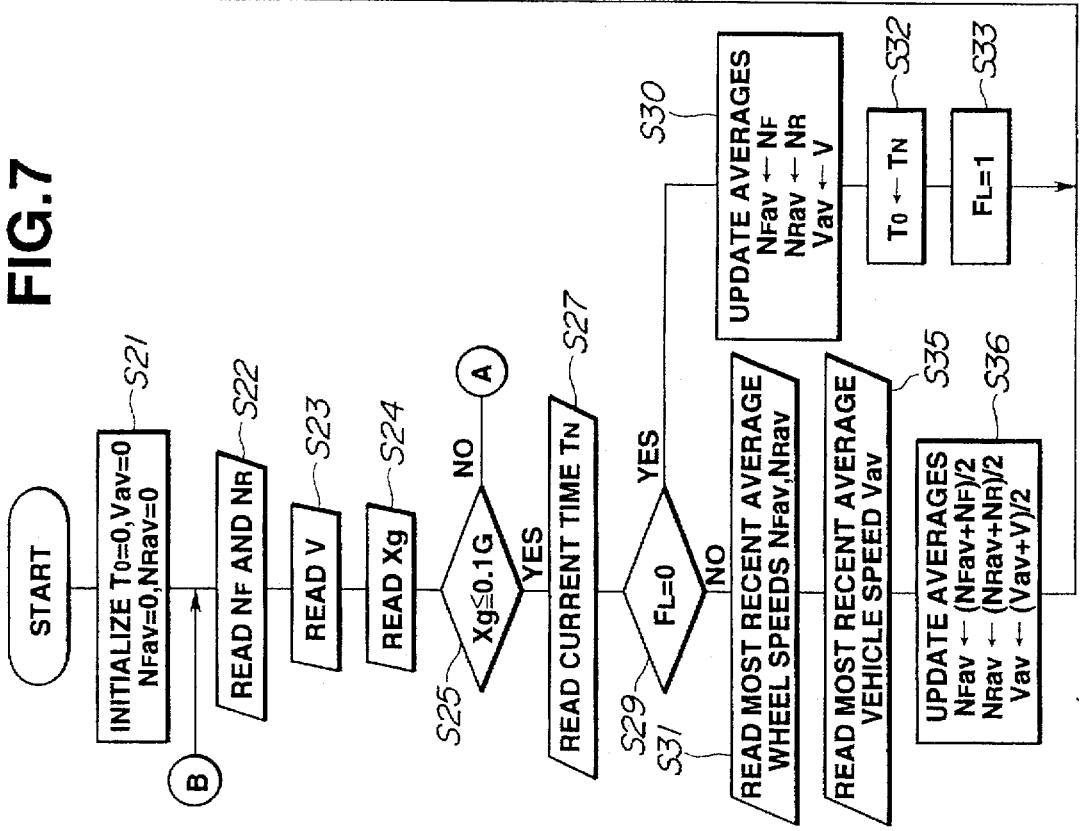

10

CONTROL SYSTEM FOR DISTRIBUTING DRIVE TORQUE BETWEEN FRONT AND REAR WHEELS OF VEHICLE

This application is a Continuation of application Ser. No. 08/320,543, filed Oct. 11, 1994 now abandoned.

BACKGROUND OF THE INVENTION

The present invention relates to a control system for controlling a distribution of driving torque between the front wheels and rear wheels of a vehicle in accordance with a difference between the front wheel speed and rear wheel speed.

Various mechanisms are known for distributing driving torque between the front and rear axles. Some four wheel drive systems employ a clutch of a hydraulic or electromagnetic type, disposed in a torque path, for varying a torque transmitted therethrough, and some others employ a limited slip center (or inter-axle) differential.

Japanese Patent Provisional Publication No. H1-204826 shows one conventional example. The driving torque distribution control system of this conventional example includes a transfer clutch disposed in a torque path toward the front wheels for varying a torque transmitted to the front wheels in response to a control signal, sensors for determining a front and rear wheel speed difference between a front wheel speed and a rear wheel speed, and a controller for increasing the control signal as the front and rear wheel speed difference increases.

This conventional control system employs a control characteristic curve between the control signal and the front and rear wheel speed difference, which passes the origin of the graph, in order to improve the response of the driving torque distribution control. This control system, therefore, increases the driving torque toward the front wheels immediately when the front and rear wheel speed difference increases from zero. However, as the vehicle speed increases, the front and rear wheel speed difference in the actual vehicle increases so much even in a constant speed straight ahead operating condition in which the front and rear wheel speed difference must be zero theoretically. Therefore, specifically in the high vehicle speed range, this control system tends to shift the drive system toward the four wheel drive state too much and thereby deteriorates the fuel economy of the vehicle specifically in the constant speed straight ahead operation in the high vehicle speed range.

SUMMARY OF THE INVENTION

It is therefore an object of the present invention to provide a driving torque distribution control system for a vehicle which can fulfill the two conflicting requirements, improvement in the fuel economy and the response to driver's accelerating or decelerating operation.

According to the present invention, a driving torque distribution control system for a vehicle, comprises:

- a drive system which distributes a driving torque from a prime mover (such as an internal combustion engine) of the vehicle between a primary drive axle (rear or front axle) and a secondary drive axle (front or rear axle) of the vehicle, and which comprises an actuator for varying a driving torque distribution ratio between the primary drive axle and the secondary drive axle in response to a control signal;
- a first sensing means for determining a wheel speed difference between a primary drive wheel speed of the primary drive axle and a secondary drive wheel speed of the secondary drive axle;
- a second sensing means for detecting a constant speed running state of the vehicle; and
- a controlling means for receiving the wheel speed difference as an input signal from the first sensing means; producing the control signal for the actuator in response to the input signal by using a predetermined control characteristic between the control signal and the input signal; and modifying the control characteristic so as to decrease a share of a driving torque to the secondary drive axle when the constant speed running state is detected.

Preferably, the second sensing means may comprise a vehicle condition sensor for sensing a longitudinal acceleration of the vehicle, a vehicle speed, or an operating condition, such as a variation in a throttle valve opening degree or a variation in a brake fluid pressure, in an accelerating system or a brake system of the vehicle indicative of a driver's accelerating or decelerating command. The second sensing means may further comprise a means for determining a variation of the vehicle speed during a predetermined time interval to determine a time rate of change of the vehicle speed in an approximate manner, or for differentiating the vehicle speed to determine the time rate of change of the vehicle speed more precisely. The second sensing means may further comprise a constant speed running state detecting means which judges that the constant speed running state exists when the longitudinal acceleration or the time rate of change of the vehicle speed is equal to or smaller than a predetermined value, or when the longitudinal acceleration or the time rate of change of the vehicle speed is equal or approximately equal to zero, or when the vehicle speed or the longitudinal velocity of the vehicle remains substantially unchanged during a predetermined time duration, or when the rate of change of the throttle opening or the variation of the throttle opening per unit time is equal to or smaller than a predetermined value, etc. The controlling means may comprise a means for determining a modification quantity, such as an offset quantity corresponding to a width of a dead band, in accordance with a longitudinal speed of the vehicle, the longitudinal acceleration or deceleration of the vehicle, the acceleration or deceleration of the primary wheels of the primary drive axle, the front and rear wheel speed difference, the time rate of change of the front and rear wheel speed difference, and modifying the control characteristic in accordance with the modification quantity.

The control system can ensure a good response to the driver's input command without modifying the control characteristic especially when the driver accelerates the vehicle by depressing the accelerator pedal, and improve the fuel efficiency by modifying the control characteristic so as to increase the tendency toward the two wheel drive mode especially when the vehicle is not accelerated.

BRIEF DESCRIPTION OF THE DRAWINGS

FIG. 3 is a schematic view showing a transfer and a controller employed in the control system shown in FIG. 2.

FIG. 7 is a flow chart showing a control procedure according to a second embodiment of the present invention.

DETAILED DESCRIPTION OF THE INVENTION

Figure 1:
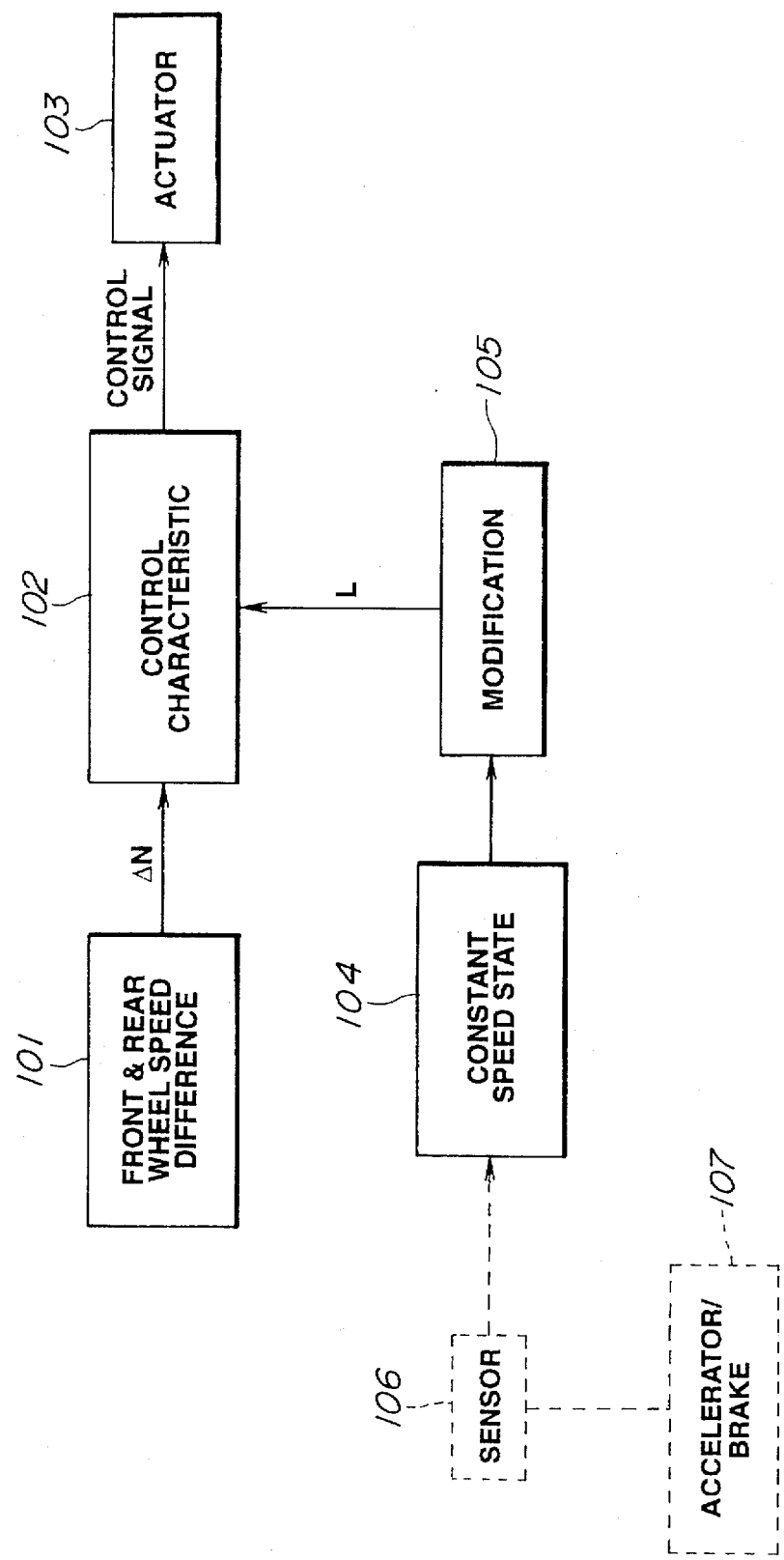
FIG. 1 is a schematic view showing, as an example, a basic arrangement of a driving torque distribution control system according to the present invention.

FIG. 1 shows, by way of example, a basic arrangement of a driving torque (or driving force) control system according to the present invention. The control system shown in FIG. 1 comprises a first sensing means 101 for determining a front and rear wheel speed difference ΔN, a controlling means (102, 105) for generating a control signal in response to an input signal representing the front and rear wheel speed difference ΔN according to a predetermined control characteristic, and an actuator 103 for varying a driving torque distribution between the front and rear drive axles of the vehicle in response to the control signal. The controlling means may determine the control magnitude of the control signal by performing mathematical operations such as subtraction and multiplication by using the control characteristic stored in the form of mathematical relationships, or the controlling means may determine the control magnitude of the control signal by a procedure of table lookup by using the control characteristic stored in the form of a data map or data maps. The control characteristic may be in the form of a monotone nondecreasing function in which the control magnitude T increases monotonically with increase of the input signal.

The control system shown in FIG. 1 further comprises a second sensing means (104, 106) for detecting a predetermined constant speed steady state of the vehicle (or a predetermined non-accelerating state), and the controlling means comprises a control signal generating means 102 for generating the control signal in accordance with the control characteristic, and a modifying means 105 for determining a modification quantity L, and modifying the control characteristic in accordance with the modification quantity L when the predetermined constant speed state (or the non-accelerating state) is detected. The second sensing means shown in FIG. 1 comprises a constant speed state detecting means 104 for detecting the constant speed state, and a vehicle condition sensor 106 for sensing a predetermined vehicle operating condition from which the constant speed state can be detected. For example, the sensor 106 may be a longitudinal acceleration sensor, or a vehicle speed sensor, or at least one wheel speed sensor, or a sensor for sensing a condition of a speed operating system 107 for enabling the driver to increase and decrease the vehicle speed. The speed operating system of the vehicle includes a vehicle's accelerator system which comprises an accelerator pedal and a throttle valve for an engine of the vehicle and a brake system which comprises a brake pedal, and a hydraulic brake circuit. For example, the detecting means 104 produces a condition signal which is in a first signal state when the longitudinal acceleration or the rate of change of the vehicle speed is equal to or smaller than a predetermined value, or when the rate of change of the throttle opening degree or the accelerator depression degree is equal to or smaller than a predetermined value, and in a second signal state when the longitudinal acceleration or the rate of change of the vehicle speed is greater than the predetermined value, or when the rate of change of the throttle opening degree or the accelerator depression degree is greater than the predetermined value. In this case, the modifying means 105 modifies the control characteristic when the condition signal is in the first signal state.

FIGS. 2–6 show a driving torque (or driving force) distribution control system according to a first embodiment of the present invention. This embodiment employs a vehicle having a four wheel drive system based on a FR (front engine rear wheel drive) system.

Figure 2:
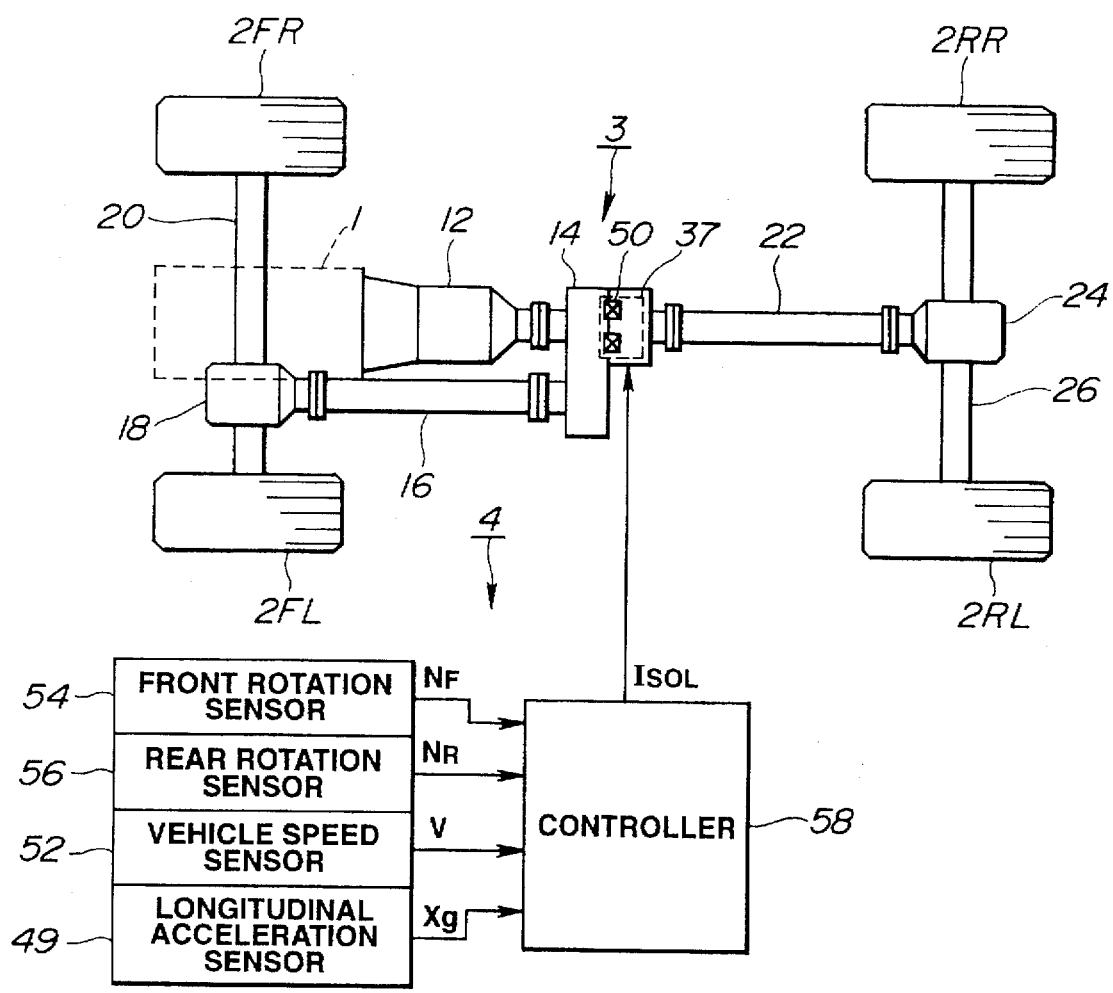
FIG. 2 is a schematic view showing a vehicle equipped with a torque distribution control system according to a first embodiment of the present invention.

The 4WD vehicle shown in FIG. 2 has a prime mover (or a source of driving torque of the vehicle) 1 which, in this example, is an engine such as an internal combustion engine, left and right front wheels 2FL and 2FR, left and right rear wheels 2RL and 2RR, a drive system (or drive train) 3 for distributing the drive torque from the engine 1 between the front and rear wheels at a controlled ratio, and a controlling system 4 for controlling the distribution ratio of the driving torque between the front and rear wheels.

The drive train 3 has a manual or automatic transmission 12, a transfer 14 for apportioning the drive torque between the front and rear wheels, a longitudinally extending front drive shaft 16 (also called a front propeller shaft), a front differential 18, a transversely extending front drive axle 20, a longitudinally extending rear drive shaft 22 (also called a rear propeller shaft), a rear differential 24 and a transversely extending rear drive axle 26. In the case of the manual transmission, the drive train 3 further has a master clutch for connecting and disconnecting the transmission 12 from the engine 1.

The transfer 14 can divide the input torque from the transmission 12 into a front wheel drive torque and a rear wheel drive torque. The front wheel drive torque is transmitted from the transfer 14 through the front drive shaft 16, the front differential 18 and the front drive axle 20 comprising left and right front axle shafts, to the left and right front wheels 2FL and 2FR. Similarly, the rear wheel drive torque is transmitted through the rear drive shaft 22, the rear differential 24 and the rear drive axle 26 comprising left and right axle shafts, to the left and right rear wheels 2RL and 2RR.

As schematically shown in FIG. 3, the transfer 14 has a transfer case (housing) 28, an input shaft (or transfer input member) 30 rotatably supported by a bearing means comprising a bearing 31, and a rear wheel drive output shaft (or first output member) 33 rotatably supported by a bearing means comprising a bearing 32. A first end (left end as viewed in FIG. 3) of the input shaft 30 is connected with the output side of the transmission 12, and the other end is connected with one end of the rear output shaft 33. In this example, the input shaft 30 and the rear output shaft 33 are aligned, and drivingly connected end to end. Similar transfers are disclosed in the above-mentioned Japanese Patent Provisional Publication No. H1-204826 and a U.S. Pat. No. 4,773,500.

The transfer 14 further has a torque distributing transfer clutch 37 disposed in a torque path to the front wheels. When the transfer clutch 37 is disengaged, all the input torque inputted to the input shaft 30 of the transfer 14 is transmitted to the rear wheels through the rear output shaft 33. In this case, the front and rear torque distribution ratio is 0:100. In this sense, the vehicle of the example shown in FIGS. 2 and 3 is said to be based on the FR system, the rear wheels 2RL and 2RR are primary drive wheels, and the front wheels 2FL and 2FR are secondary drive wheels.

The transfer clutch 37 of this example is an electromagnetic type multiple disc clutch capable of varying the drive torque distribution ratio between the front and rear wheels continuously. The transfer clutch 37 as shown in FIG. 3 has a clutch drum 37a splined to the input shaft 30; friction plates 37b engaged with the clutch drum 37a so that relative rotation therebetween is prevented; a clutch hub 37c rotatably mounted on the input shaft 30 through needle bearings; friction discs 37d engaged with the clutch hub 37c so that relative rotation therebetween is prevented, a clutch piston 37f disposed on one side (left side in FIG. 3) of the alternating clutch pack of the friction plates and discs 37b and 37d; and a proportional electromagnetic solenoid 50. The piston 37f is located axially between the clutch pack and the solenoid 50. There is further provided a return spring 37h for normally holding the friction plates 37b and the friction discs 37d disengaged from each other.

The transfer 24 further includes a gear train consisting of first, second and third gears 41a, 41b and 41c. The first gear 41a is splined to the clutch hub 37c. The second gear 41b is rotatably supported by bearings 40a and 40b, and engaged between the first and third gears 41a and 41c. The third gear 41c is rotatably supported by bearings 42 and 43, and connected with the front drive shaft 16. The third gear 41c can be regarded as a front wheel side (second) output member of the transfer 14 whereas the output shaft 33 is the rear wheel side (first) output member.

When the solenoid 50 is deenergized, or when a command current Isol supplied to the solenoid 50 is zero, then the friction plates 37b on the driving side and the friction discs 37d on the driven side are separated by the resilient force of the return spring 37h. In this disengaged state of the transfer clutch 14, the input torque of the transfer input shaft 30 is all transmitted through the rear output shaft 33 to the rear drive shaft 22 toward the rear wheels 2RL and 2RR, and none is transmitted toward the front wheels. The vehicle is driven in the two rear wheel drive mode.

Figure 4:
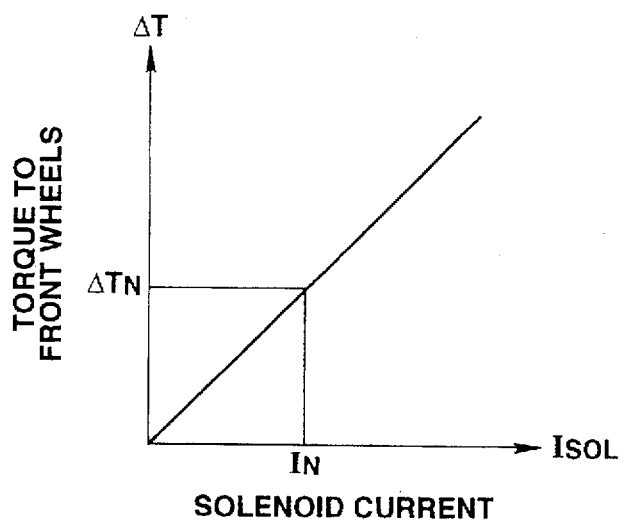
FIG. 4 is a graph showing a characteristic between a driving torque transmitted to front wheels of the vehicle shown in FIG. 2 and a solenoid current Isol supplied to a solenoid 50 shown in FIG. 3.

When the command current Isol to the solenoid 50 is greater than zero, the solenoid 50 moves the piston 37f in accordance with the magnetic field, and produces a frictional engagement force between the plates and discs 37b and 37d. Therefore, a part of the input drive torque is transmitted to the front wheels 2FL and 2FR through the front drive shaft 16. The torque $\Delta T$ transmitted toward the front wheels 2FL and 2FR is proportional to the magnetic field intensity of the proportional electromagnetic solenoid 50, and accordingly the front wheel drive torque $\Delta T$ is proportional to the magnitude of the command current Isol, as shown in FIG. 4. This control system can increase the front wheel drive torque $\Delta T$ continuously and linearly in accordance with the command current Isol. This command current Isol can be regarded as a control signal. As the transfer clutch 37, it is possible to employ a electromagnetic powder clutch, which can improve the linearity between the front wheel drive torque $\Delta T$ and the control signal. The drive torque distribution ratio between the front and rear axles is 0:100% when the command current Isol is equal to zero, and 50:50% when the command current Isol is equal to a preset maximum value. Between these two limits, this control system can vary the drive torque distribution ratio continuously.

A sensor group of this control system includes a front side rotation sensor 54, a rear side rotation sensor 56, a vehicle speed sensor 52 and a longitudinal acceleration sensor 49, as shown in FIG. 2. A controller 58 receives the output signals from these sensors and controls the driving torque distribution ratio by producing the current control signal Isol.

The front and rear side rotation sensors 54 and 56 of this example are associated with the front and rear drive shafts 16 and 22, respectively. Each of the front and rear side rotation sensors 54 and 56 optically or electromagnetically senses the number of revolutions of the associated drive shaft 16 or 22 per unit time, and produces a pulse signal or sinusoidal signal indicative of a front or rear wheel speed Nf or Nr. As the front and rear side rotation sensors 54 and 56, it is possible to employ front and rear side rotation sensors disclosed in Japanese Patent Provisional Publication No. H1-195126. In determining a wheel speed from a wheel rpm, a tire diameter is involved as a parameter, and accordingly the determined wheel speed can deviate from the actual wheel speed when the diameter of an actual tire is different from the initially set tire diameter.

The vehicle speed sensor 52 senses the speed of the vehicle and produces a voltage signal indicative of a sensed vehicle speed V. This voltage output increases in the positive direction in accordance with the vehicle forward velocity.

The longitudinal acceleration sensor 49 senses the longitudinal acceleration of the vehicle, and produces a voltage signal indicative of a sensed longitudinal vehicle acceleration Xg. This voltage signal has a positive value in the case of the positive acceleration, and a negative value in the case of the negative acceleration (that is, deceleration). The absolute value of the voltage signal corresponds to the magnitude of the acceleration.

The controller 58 comprises a microcomputer 70 and a driver circuit 59 for producing the control signal Isol, as shown in FIG. 3. The microcomputer 70 has an input interface circuit 70a having the function of AD conversion for receiving the sensor signals from the sensors 54, 56, 52 and 49, a processing section (CPU) 70b, a memory section 70c including ROM and RAM, and an output interface circuit 70d having the function of DA conversion for delivering a clutch control signal St determined by the processing section 70b.

Figure 6:
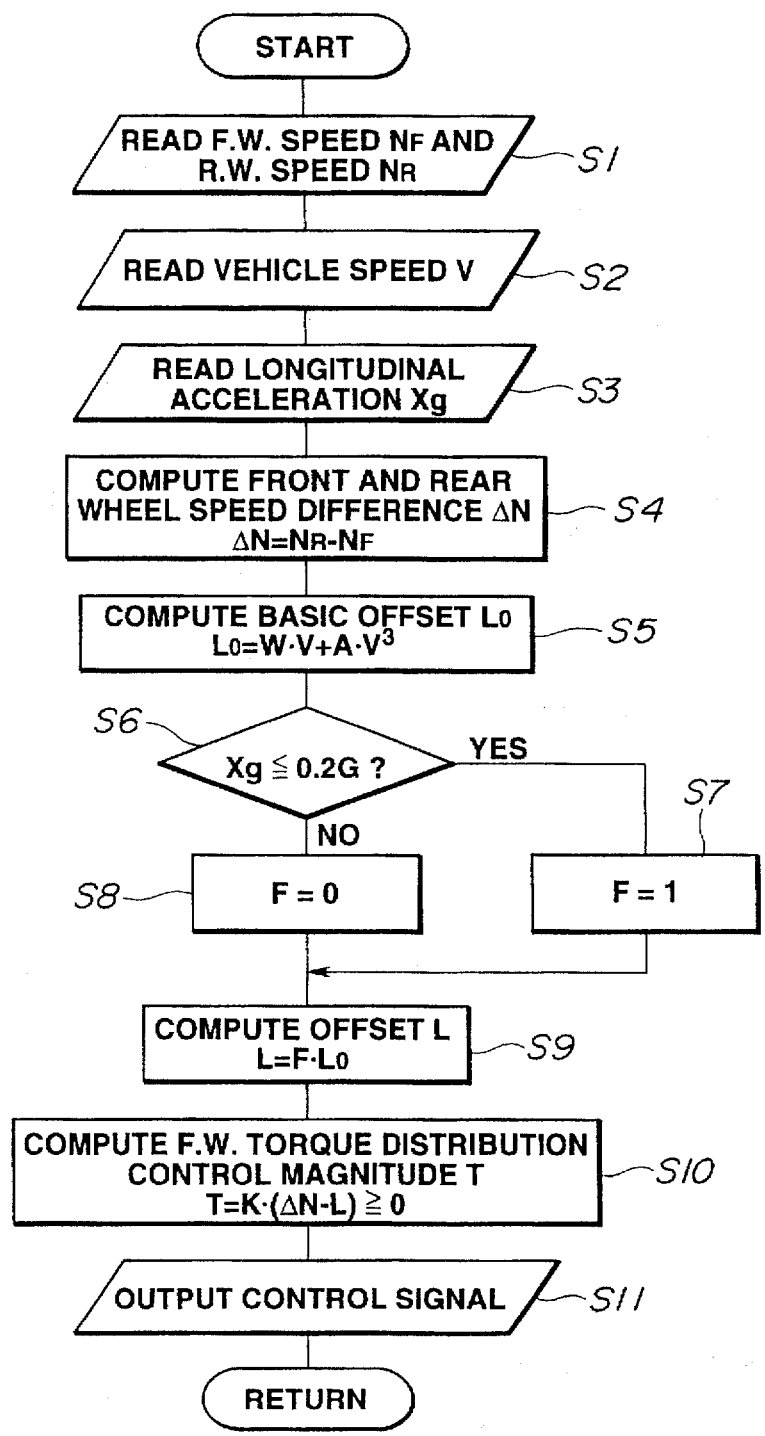
FIG. 6 is a flow chart showing a control procedure performed by the controller according to the first embodiment of the invention.

According to a control procedure shown in FIG. 6, the microcomputer 70 determines a front and rear wheel speed difference $\Delta N$ from the sensed front and rear wheel speeds Nf and Nr; a basic offset L0 dependent on the sensed vehicle speed V; a weight coefficient F dependent on the sensed longitudinal acceleration Xg; a desired final offset L which is equal to the basic offset L0 multiplied by the weight coefficient F; and a desired front torque distribution control magnitude T which is the result of multiplication, by a predetermined proportional factor (or gain) K, of a difference ($\Delta N-L$) between the front and rear wheel speed difference and the desired offset L. The thus-determined front torque distribution command T is represented by a control signal St and delivered to the driver circuit 59.

The driver circuit 59 has a circuit, such as a floating type constant voltage circuit, for converting the command T to the command current Isol for the proportional electromagnetic solenoid 50. The command current Isol is zero when T=0, and Isol is equal to the maximum value when T is equal to a value corresponding to "50". The command current Isol is proportional to T. That is, Isol=m·T where m is a predetermined proportionality constant.

This control system is based on the following consideration. When a driving force is applied to a tire, an apparent grip of the tire decreases by an amount consumed for transmission of traction. When the primary drive wheels fall into the slipping state because of the driving force, the control system of this embodiment is arranged to increase the drive torque transmitted to the secondary drive wheels. To detect the slippage of the wheels, the control system of this example monitors the wheel speed difference $\Delta N$ between the primary drive wheel speed and the secondary drive wheel speed. The wheel speed difference $\Delta N$ is the result of subtraction of the secondary drive wheel speed which, in this embodiment, is the front wheel speed $N_f$, from the primary drive wheel speed which, in this embodiment, is the rear wheel speed $N_r$. That is, $\Delta N$ is given by:

$$\Delta N = NR - NF \tag{1}$$

In this example, the front and rear wheel speeds NF and NR are determined by using the front and rear rotation sensors 54 and 56. However, it is optional to determine the front and rear wheel speeds by using four wheel speed sensors. In this case, the front wheel speed $N_f$ is equal to the average of the speeds of the left and right front wheels 2FL and 2FR sensed, respectively, by the left and right front wheel speed sensors, and the rear wheel speed $N_r$ is equal to the average of the speeds of the left and right rear wheels 2RL and 2RR sensed, respectively, by the left and right rear wheel speed sensors. When the rear wheels fall into the slipping state because of the driving force, and the speed difference $\Delta N$ increases, then the control system of this example increases the driving torque transmitted to the front wheels, and relatively decreases the drive torque transmitted to the rear wheels. When the front wheels fall into the slipping state, the control system of this example does not perform the driving torque distribution control. That is, the magnitude of the control signal in this example is held equal to zero when the front and rear wheel speed difference $\Delta N$ is smaller than zero.

On the other hand, it is difficult to judge from the front and rear wheel speed difference $\Delta N$ alone whether the vehicle is in a constant speed running state or not. Even when $\Delta N$ is positive, and the rear wheels can be considered to be slipping relative to the front wheels, a part of the driving force transmitted to the rear wheels is consumed for the transmission of traction against the running resistance increasing with an increase in the vehicle speed.

The control system of this embodiment, therefore, controls the front and rear wheel drive torque distribution by basically determining the control magnitude T in accordance with a control characteristic based on the front and rear wheel speed difference $\Delta N$, and shifts the control characteristic by a predetermined offset quantity in the positive direction when the vehicle is in a constant speed running state. There is formed a dead band, and the control system does not responds until the front and rear wheel speed difference $\Delta N$ exceeds the offset quantity L. When the constant speed running state is judged to exist, the control system holds the drive system in the two rear wheel drive state in the dead band of $\Delta N$ from zero to L. When the front and rear wheel speed difference $\Delta N$ increases beyond the dead band, the control system increases the front wheel drive torque adequately in response to the front and rear wheel speed difference $\Delta N$.

The offset quantity (or the dead band width) L is determined in accordance with the running resistance of the vehicle so as to improve the fuel consumption. The offset quantity L of this embodiment is a sum of a first term L1 and a second term L2. The first term L1 corresponds to a driving force consumed for traction transmission against the running resistance of the vehicle. The second term L2 relates to errors in the sensed wheel speeds $N_f$ and $N_r$ due to tire diameter variation.

The first term L1 of this embodiment is expressed as:

$$L1 = A \cdot V^3 \tag{2}$$

The first term L1 is a cubic term proportional to the third power of the vehicle speed V. The first term L1 of this example is equal to the third power of the vehicle speed V multiplied by a predetermined vehicle characteristic parameter (or coefficient) A. The parameter A is determined in consideration of the tire characteristics and aerodynamic force coefficient, and treated as a constant. It is known that the driving force consumption for traction transmission against the running resistance of a vehicle is proportional to the third power of the vehicle speed.

The second term L2 of this embodiment is given by:

$$L2 = W \cdot V \tag{3}$$

The second term L2 is a linear term obtained by multiplying the vehicle speed V by a predetermined tire diameter compensating parameter (or coefficient) W. In determining the front and rear wheel speeds $N_f$ and $NR$ from the sensed numbers of revolutions of the wheels, the tire diameters are involved as parameters. When the diameter of a tire currently being used is different from an initially determined tire diameter, then the wheel speed calculated by using the initial tire diameter is no longer exact. The control system of this example is designed to operate adequately so as to improve the fuel economy even when the vehicle is equipped with one or more tires which do not conform to the initial standards, as long as the tire diameters are within a predetermined allowable range. When, for example, the tire diameter allowable range is set as ±x %, the compensating parameter W is set as ±x %/100.

The compensating parameter W should be negative when at least one of the rear wheels 2RL and 2RR is equipped with a different diameter tire of an outside diameter greater than the initial setting, or when at least one of the front wheels 2FL and 2FR is equipped with a different diameter tire having an outside diameter smaller than the initial setting; and positive when the outside tire diameter of at least one of the rear wheels is smaller than the initial set value, or when the outside tire diameter of at least one of the front wheels is greater than the initial set tire diameter. However, the control system of this example employs only the positive value of the compensation parameter W, and increases the offset amount L with the positive compensation parameter W.

It is, however, optional to employ both of at least one negative value of W and at least one positive value of W, or to employ a means for adjusting the compensation parameter W in accordance with the actual tire diameters of the vehicle. For example, this means may comprises a simple switch, or a selector switch, or a keyboard for selecting one of the values of the parameter W. Once the value of the parameter W is determined, the control system treats the parameter W as a constant.

In this embodiment, a basic offset quantity L0 is first determined as being a sum of L1 and L2. That is:

$$L0 = L2 + L1 = W \cdot V + A \cdot V^3 \tag{4}$$

Then, a final offset quantity L is determined from the basic offset quantity L0 and a weight coefficient F.

$$L = F \cdot L0 \tag{5}$$

The weight coefficient F is set equal to one when the vehicle is in the predetermined constant speed running state, and equal to zero when it is not. The control system of this example detects the constant speed running state by checking whether the sensed longitudinal acceleration Xg of the vehicle is equal to or lower than a predetermined threshold acceleration value B. In this example, B is equal to 0.2 G in consideration of the accuracy of the longitudinal acceleration sensor 49. Therefore, F=1 when Xg is equal to or lower than 0.2 G, and F=0 when Xg is higher than 0.2 G. (G is a unit of acceleration equal to the acceleration of gravity.)

Figure 5:
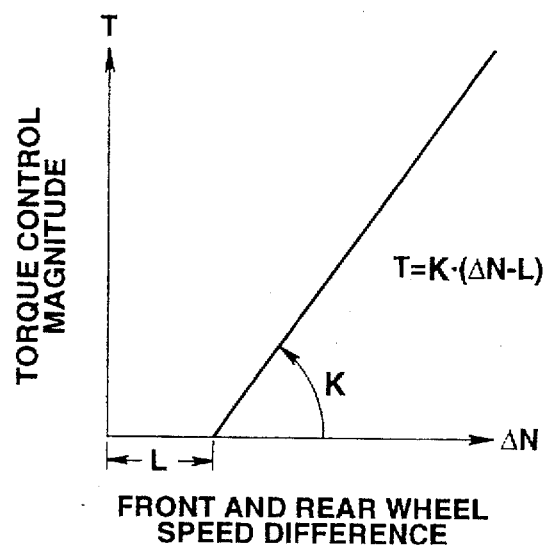
FIG. 5 is a graph showing a control characteristic between a control magnitude T and a front and rear wheel speed difference ΔN, employed in the controller 58 shown in FIGS. 2 and 3.

From the thus-determined offset quantity L, the control system determines the front wheel drive torque distribution control magnitude T by using the following equation (6) as shown in FIG. 5.

$$T = K \cdot (\Delta N - L) \quad (6)$$

When $\Delta N$ is greater than L, T increases monotonically and smoothly with increase in $\Delta N$, as shown in FIG. 5. In this example, T increases linearly as $\Delta N$ increases in the range beyond the dead band of L.

The microcomputer 70 in the controller 58 according to the first embodiment determines the control magnitude T by performing the control procedure shown in the flowchart of FIG. 6. The routine of FIG. 6 is executed periodically (every 20 msec, for example) as a timer interrupt process.

At a first step S1, the CPU 70b reads the front wheel speed Nf sensed by the front wheel rotation sensor 54, and the rear wheel speed NR sensed by the rear rotation sensor 56.

At a second step S2, the CPU 70b reads the vehicle speed V sensed by the vehicle speed sensor 52.

At a third step S3, the CPU 70b reads the vehicle longitudinal acceleration Xg sensed by the longitudinal acceleration sensor 49.

At a fourth step S4, the CPU 70b calculates the front and rear wheel speed difference $\Delta N$ according to the equation (1) by using the sensed front and rear wheel speeds Nf and Nr obtained at the step S1.

At a fifth step S5, the CPU 70b determines the basic offset quantity L0 according to the equation (4) by using the sensed vehicle speed V obtained at the step S2.

At a sixth step S6, the CPU 70b determines whether the sensed longitudinal acceleration Xg obtained at the step S3 is equal to or smaller than the predetermined value B (=0.2 G). If Xg≦B, then the CPU 70b proceeds from the step S6 to a step S7. If Xg>B, then the CPU 70b proceeds to a step S8.

At the step S7, the CPU 70b judges that the vehicle is in the predetermined constant speed running state, and accordingly sets the weight coefficient F equal to one. Then, the CPU 70b proceeds to a step S9.

At the step S8, the CPU 70b judges that the vehicle is not in the predetermined constant speed running state but in a predetermined accelerating state, and accordingly sets the weight coefficient F equal to zero. After the step S8, the CPU 70b proceeds to the step S9.

At the step S9, the CPU 70b determines the final offset quantity L according to the equation (5) by using the weight coefficient F determined at the step S7 or S8, and the basic offset quantity L0 determined at the step S5.

At a next step S10, the CPU 70b determines the front wheel drive torque distribution control magnitude T according to the equation (6) by using the front and rear wheel speed difference $\Delta N$ calculated at the step S4, and the final offset amount L calculated at the step S9.

At a step S11, the microcomputer 70 outputs the control signal St representing the front wheel drive torque distribution control magnitude T determined at the step S10, to the driver circuit 59. Thereafter, the CPU 70b returns to a main program.

The front and rear wheel driving force distribution control system according to the first embodiment is operated as follows.

When the vehicle is in a constant speed straight ahead motion at a very low constant vehicle speed on a high mu (μ) good road having a flat road surface of a sufficient friction coefficient, the running resistance of the vehicle is low, and accordingly the traction of the primary drive wheels 2RL and 2RR consumed for holding the vehicle at the constant speed, that is the driving force transmitted from the engine output to the road surface, is small, so that the slip of the primary drive wheels 2RL and 2RR is very small. Therefore, the front and rear wheel speed difference $\Delta N$ calculated in each sampling time at the step S4 remains almost equal to zero.

The vehicle parameter A is set at a very small value since it is a coefficient for multiplying the third power of the vehicle speed V, and the vehicle speed V itself is very small in this very low speed operation. As a result, the first term L1 of the offset quantity is small. The compensating parameter W is not so large, and the second term L2 is not so large either since the vehicle speed V is very low. Therefore, the basic offset quantity L0 determined in each sampling time at the step S5 is not so large. The sensed longitudinal acceleration Xg remains lower than or equal to 0.2 G in this very low constant speed operation, and the weight coefficient F is set at one. As a result, the offset L determined at the step S9 is equal to a relatively small value.

Because $\Delta N$ is zero or nearly zero, and the offset quantity L has the relatively small value, the control magnitude T determined in each sampling time at the step S10 is nearly zero, or has a small negative value. In this example, the control magnitude T is prevented from becoming lower than zero, and the control magnitude T is made equal to zero when the result of the calculation of the step S10 is negative.

The exactly or approximately null control magnitude T thus determined by the CPU 70b is converted from the digital form to the analog form in the output interface circuit 70d, and a resultant analog voltage control signal ST representing the control magnitude T is outputted from the microcomputer 70 to the driver circuit 59. In response to the voltage control signal St, the driver circuit 59 produces the current control signal Isol which is zero or approximately equal to zero, and sends the current control signal Isol to the proportional electromagnetic solenoid 50 which is a main component of the actuator of this control system.

Therefore, the solenoid 50 remains deenergized, and the transfer clutch 37 remains disengaged. Consequently, 100 percent of the driving force from the engine is transmitted through the rear drive shaft 22 to the rear wheels 2RL and 2RR, and the vehicle is driven in the two wheel drive mode. Thus, the control system of this embodiment can prevent the fuel consumption from becoming poor.

When the driver depresses the accelerator pedal of the vehicle to accelerate the vehicle without turning the steering wheel from this very low constant straight operation, then the driving force transmitted to the rear wheels 2RL and 2RR is increased. That is, the engine output increases at a rate corresponding to the rate of increase of the accelerator depression degree or the throttle opening degree, and consequently, the driving force of the rear wheels increases at a corresponding rate. As a result, the grip force of the rear wheels decreases, and the slippage of the rear wheels appears in accordance with the rate of increase of the driving force.

Therefore, the front and rear wheel speed difference $\Delta N$ increases from zero to a value corresponding to the rate of increase of the driving force transmitted to the rear wheels 2RL and 2RR, and the rate of change of the depression degree of the accelerator pedal.

As the vehicle speed V increases, the basic offset quantity L0 is increased mainly by an increase of the cubic first term L1 proportional to the third power of the vehicle speed V, and partly by an increase of the linear second term L2 proportional to the vehicle speed V.

However, in the accelerating state of the vehicle, the longitudinal acceleration Xg becomes higher than 0.2 G, and the weight coefficient F is set to zero. As a result, the final offset quantity L is held equal to zero notwithstanding the increase of the basic offset quantity L0.

During acceleration, the offset L is zero, and therefore, the control magnitude T increases immediately as the front and rear wheel speed difference ΔN increases. When the driver depresses the accelerator pedal hard to effect a hard acceleration, the rate of increase of the depression degree of the accelerator pedal is higher, the rate of increase of the opening degree of the throttle valve of the engine is higher, and the rate of increase of the rear wheel driving force is higher, so that the slip of the rear wheels 2RL and 2RR increases, and hence the front and rear wheel speed difference ΔN increases. The control system can immediately respond to this increase in the front and rear wheel speed difference ΔN with the offset L held equal to zero. When the accelerator pedal is depressed mildly, the rate of increase of the rear wheel driving force is small, the front and rear wheel speed difference ΔN does not increase so much, and the control system holds the control magnitude T at a relatively low level.

In this way, the control system delivers the driving force from the engine to the front wheels in a real time manner in response to the slip of the rear wheels 2RL and 2RR or the front and rear wheel speed difference ΔN varying in accordance with the intention of the driver. The control system can prevent the slip of the rear wheels 2RL and 2RR, and provide a stable accelerating operation by increasing the tendency toward the four wheel drive mode.

If, during acceleration, the rear wheels 2RL and 2RR encounter a low mu area such as a puddle, the slip of the rear wheels 2RL and 2RR increases largely, and the front and rear wheel speed difference ΔN further increases to a considerably high positive level. If, in this case, the longitudinal acceleration Xg remains higher than 0.2 G because of the inertia of the vehicle, the control system holds the offset L equal to zero, and increases the control magnitude T by immediately responding to this temporary sharp increase in the front and rear wheel speed difference ΔN. Therefore, the transfer clutch 37 increases the clutch engagement force, so that the share of the engine output torque allotted to the front wheels is increased toward the upper limit of 50%, and the driving force to the rear wheels is decreased. As a result, the rear wheels 2RL and 2RR are released from the slipping state due to traction loss, and the vehicle can continue a stable driving operation.

When the vehicle is started on a low μ road surface, the control system ensures a stable starting operation by eliminating the rear wheel slip in the same manner. When the front wheels 2FL and FR fall in a slipping state on a low μ road surface, and the front and rear wheel speed difference ΔN becomes negative, the control system of this example does not perform the drive torque distribution control and holds the control magnitude T equal to zero.

When the vehicle is in a medium or high constant speed operation on a high mu flat good road, the running resistance is relatively high, and the slip of the rear wheels 2RL and 2RR is relatively great since the traction of the rear wheels (i.e. the driving force transmitted to the road surface) for keeping the vehicle at the medium or high constant vehicle speed against the running resistance is great. Therefore, the front and rear wheel speed difference ΔN becomes positive and relatively great. Since the vehicle speed V is in a medium or high speed range, the basic offset quantity L0 is increased predominantly by the first term L1 proportional to the third power of the vehicle speed V. In this constant speed operation, the longitudinal acceleration Xg remains equal to or lower than 0.2 G, so that the weight coefficient F is set at one, and the final offset quantity L is set equal to the basic offset quantity L0.

In this medium or high constant speed operating state, the first term L1 of the basic offset quantity L0 is so high that the offset quantity L is normally higher than the front and rear wheel speed difference ΔN. Therefore, the result of the calculation of the equation (6) becomes approximately equal to zero or a negative small value, and the control magnitude T is made equal to zero or approximately equal to zero. Consequently, the vehicle is driven in the two rear wheel drive mode, and the fuel consumption is prevented from deteriorating.

During the medium or high speed constant operation, the front and rear wheel speed difference ΔN may increase abnormally because of a rear wheel slip on a slippery road surface region. If, in this case, the longitudinal acceleration Xg remains equal to or lower than 0.2 G, the offset quantity L is set at a relatively high value. However, the front and rear wheel speed difference ΔN increases beyond the offset quantity L because of the rear wheel slip, and the control system increases the control magnitude T in accordance with the excess of the front and rear wheel speed difference ΔN beyond the offset quantity L, to decrease the rear wheel driving force and eliminate the excessive rear wheel slip. The vehicle can continue the stable medium or high constant speed operation.

A negative acceleration or deceleration occurs in the vehicle when the brake pedal is depressed or a shift-down operation is performed in the medium or high speed operation. In such a decelerating operation, the throttle of the engine is fully closed, the driving force transmitted to the rear wheels is null or very low, and the front and rear wheel speed difference ΔN is zero or approximately zero unless an abnormal condition such as a lock of the front wheels 2FL and 2FR exists. On the other hand, the control system determines the basic offset amount L0 in accordance with the decreasing vehicle speed V, sets the weight coefficient F to one in response to the longitudinal acceleration which is smaller than 0.2 G during deceleration, and sets the final offset L equal to L0. As a result, the control magnitude T is held equal to zero or slightly smaller than zero. Therefore, the vehicle is operated fuel-efficiently in the two rear wheel drive mode. Even if, in a vehicle equipped with a manual transmission, the driver tries a double clutching operation by depressing the accelerator pedal together with a shift-down operation but the timing of depression of the accelerator pedal is not adequate so that the driving force is transmitted to the rear wheels, the control system enables the vehicle to continue the stable decelerating operation by increasing the control magnitude in accordance with the excess by which the front and rear wheel speed difference ΔN exceeds the offset L.

When the vehicle running at a medium or high constant speed enters a wet asphalt pavement having a relatively low friction coefficient, the tire grip decreases in accordance with the low friction coefficient, and the driving force of the rear wheels 2RL and 2RR, that is, the traction to hold the vehicle at the constant speed against the running resistance, readily reaches saturation at a relatively low level. Therefore, the driving force exceeding the saturation level causes the rear wheels to slip and suffer a traction loss. When, in this case, the vehicle continues the constant speed operation without decreasing the speed, the offset L is set at a positive value, and therefore, the control system allows the rear wheel slip to a limited extent to allow the straight ahead constant speed operation, and eliminates the excessive rear wheel slip by increasing the front wheel drive torque in accordance with the excess of the front and rear wheel speed $\Delta N$ beyond the offset amount L. If the vehicle is decelerated on the low mu road surface, the basic offset L0 and hence the final offset L decrease with decrease in the vehicle speed V, and the control system increases the front wheel drive torque more speedily in response to the front and rear wheel speed difference $\Delta N$.

In order to improve the cornering performance of the vehicle, it is possible to employ a yawing motion control system disclosed in Japanese Patent Application No. H5-262698 or No. H5-262699.

The steps S1 and S4 shown in FIG. 6 and the rotation sensors 54 and 56 correspond to the first sensing means 101 shown in FIG. 1, the step S6 corresponds to the constant speed state detecting means 104, and the steps S5 and S9 correspond to the modification means 105.

It is possible to further employ a means for sensing or estimating a lateral acceleration of the vehicle. For example, this means comprises a lateral acceleration sensor for directly sensing a lateral acceleration $Y_g$ of the vehicle; or this means may comprises one or more other sensors (such as a steering wheel angle sensor) for sensing the lateral acceleration indirectly, and a means for calculating the lateral acceleration from the steering wheel angle and vehicle speed, for example. In this case, the gain K is determined so that the gain K is inversely proportional to the lateral acceleration $Y_g$ as in U.S. Pat. Nos. 4,986,388 and 5,060,747. The description and figures in these patents about the adjustment of the control gain based on the lateral acceleration are herein incorporated by reference.

A second embodiment of the present invention is shown in FIG. 7. A control system according to the second embodiment is almost the same as the control system shown in FIGS. 2 and 3, and has the drive system including the transfer clutch 37 as shown in 25 FIGS. 2 and 3, the sensor group including the sensors 54, 56, 52 and 49 as shown in FIG. 2, and the controller 58.

The second embodiment is difference from the first embodiment in the control algorithm performed by the microcomputer 70 in the controller 58. The control algorithm of the second embodiment is designed to modify the vehicle parameter A by a learning control. With the vehicle parameter A updated by the learning process, the second term L2 can be absorbed in the first term L1.

The driving force consumed for traction transmission is dependent on the tire characteristic and the friction coefficient of the road surface. Therefore, it is possible to determine the vehicle parameter A more accurately by taking account of these factors. The first term L1 determined from the vehicle speed V and the vehicle parameter A fixed at a predetermined constant value is not always adequate enough for various road surface conditions. The running resistance can be defined so that the running resistance is high when the traction loss occurs earlier with respect to the driving force loaded to the wheels, and the running resistance is low when the traction loss occurs later. In this case, the running resistance is considered to be low on a high mu road surface such as a dry concrete pavement. If the vehicle parameter A is set equal to a low value corresponding to such a high mu road surface, then the offset amount L corresponding to the dead band width becomes too small for a very low mu road surface such as a road surface covered with snow or ice or a wet tiled road surface. The tires lose the gripping force earlier on such a very low friction road surface, but the vehicle can still performs a constant speed operation in a partly slipping state.

However, the front and rear wheel speed difference $\Delta N$ readily exceeds the first offset term L1 which is set too small for such a very low mu road surface, and the driving force to the front wheels is increased. As a result, the fuel efficiency becomes poor.

If, on the other hand, the vehicle parameter A is set at a high value corresponding to the very low friction surface, the offset amount L becomes too great. Therefore, even when the front and rear wheel speed difference $\Delta N$ is increased on the high friction surface by the driver wanting to accelerate the vehicle rapidly by increasing the driving force to the rear wheels regardless of the possibility of slippage, the dead band is not readily exceeded, and the drive system is not readily shifted toward the four wheel drive state. Consequently, the control system cannot eliminate the slippage of the primary drive wheels speedily, and cannot improve the vehicle running stability.

Furthermore, it is not easy to choose the threshold value B (0.2 G in the example shown in FIG. 6) of the longitudinal acceleration $X_g$ when the vehicle parameter A is fixed. When, for example, the vehicle is going downhill, the actual running resistance of the vehicle becomes small because of the acceleration of gravity acting on the vehicle, and the slip of the primary drive wheels becomes low because the depression degree of the accelerator pedal tends to become smaller. In this state, the threshold of the longitudinal acceleration must be set at a relatively high value in order to lessen the influence of the acceleration of gravity and improve the fuel economy by keeping the two wheel drive mode in such a downhill running state. If the threshold is set at a low value, then the longitudinal acceleration $X_g$ exceeds the threshold too early under the influence of acceleration of gravity even though the driver intends to continue a constant speed operation. On an uphill road, on the other hand, even if the driver depresses the accelerator pedal to accelerate the vehicle and the slip of the primary drive wheel increases, the longitudinal acceleration $X_g$ does not increase immediately under the influence of the acceleration of gravity, and it takes a considerable time for the longitudinal acceleration to exceed the threshold which is set at the high value corresponding to the downhill state. Therefore, the control system is unable to timely respond to the slip of the primary drive wheels.

To meet these problems, the control system of the second embodiment is arranged to update the vehicle parameter A in accordance with the most recent constant running condition, and use the updated parameter to determine the offset quantity L. That is, the vehicle parameter is determined from a correlation between an average vehicle speed in the constant speed running state on a high mu road surface and an average front and rear wheel speed difference, by using the above-mentioned equation (2). The thus-determined vehicle parameter A becomes relatively small on the high mu road surface, and the control system can eliminate the slip of the primary drive wheel speedily with the small offset quantity L corresponding to the relatively small parameter A. On a very low friction surface, the vehicle parameter is set at a relatively high value, and the control system can improve the fuel economy on the very low friction surface with the relative large offset quantity L. In this case, the offset quantity L is prevented from becoming too high by the learning control.

When the vehicle parameter A is set at a small value corresponding to a low running resistance of a running state such as downhill driving state where the slip of the primary drive wheel is low under the influence of the acceleration of gravity, the control system can shift the drive system toward the four wheel drive state speedily in response to the slip of the primary wheel, that is the driver's intention to accelerate the vehicle, before the longitudinal acceleration increases. Therefore, in this control system, it is possible to set the threshold value of the longitudinal acceleration at a small value. In this case, the vehicle parameter A can be set at a relatively great value corresponding to a great running resistance of a state in which the longitudinal acceleration is not readily increased as in a uphill drive state, and the primary drive wheels are partly slipping under the load of the driving force. As a result, the offset quantity L becomes relatively large, and accordingly the fuel economy is improved. At the same time, the longitudinal acceleration readily exceeds the low threshold value, and the control system can promptly shift the drive system toward the four wheel drive state, and improve the safety of the accelerating operation of the vehicle.

Since the front and rear wheel speed difference ΔN is taken into account in detecting the constant speed running state, the compensating component for compensating an error in the wheel speeds in a vehicle equipped with tires of different tire diameters is contained in the front and rear wheel speed difference ΔN. Therefore, the control system of the second embodiment does not use the second term L2.

The control procedure performed by the microcomputer 70 according to the second embodiment is shown in the flowchart of FIG. 7.

This control program is performed periodically as a timer interrupt process of a period ΔT (20 msec, for example).

At a first step S21, the microcomputer 70 resets each of an initial time T0, an average front wheel speed Nfav, an average rear wheel speed Nrav, an average vehicle speed Vav which are stored in the memory section 70c, to zero.

Then, the CPU 70b reads the sensed front wheel speed Nf derived from the front rotation sensor 54, and the sensed rear wheel speed Nr derived from the rear rotation sensor 56 at a second step S22, reads the sensed vehicle speed V supplied from the vehicle speed sensor 52 at a third step S23; and reads the sensed longitudinal acceleration Xg sensed by the longitudinal acceleration sensor 49 at a fourth step S24.

At a step S25, the CPU 70b examines whether the longitudinal acceleration Xg obtained at the step S24 is equal to or smaller than a predetermined acceleration threshold value B which, in this example, is 0.1 G. If Xg is greater than 0.1 G, the CPU 70b proceeds to a step S26. If Xg is equal to or lower than 0.1 G, the CPU 70b proceeds from the step S25 to a step S27.

At the step S26, the CPU 70b forcibly sets the vehicle parameter A to zero, and then proceeds from the step S26 to a step 28.

On the other hand, at the step S27, the CPU 70b reads a current time Tn derived from an individual clock counter process.

At a step S29 following the step S27, the CPU 70b checks whether a control flag Fl for indicating the constant speed running state is equal to zero or not. If the flag Fl is equal to zero in a reset state, the CPU 70b proceeds from the step S29 to a step S30. If FL=1, then the microcomputer 70 proceeds to a step S31.

At the step S30, the CPU 70b stores the sensed front wheel speed Nf obtained at the step S22 as the average front wheel speed Nfav, the sensed rear wheel speed Nr obtained at the step S22 as the average rear wheel speed Nrav, and the sensed vehicle speed V obtained at the step S23 as the average vehicle speed Vav in the memory section 70c. Thus, the CPU 70b updates the averages Nfav, Nrav and Vav at the step S30, and then proceeds to a step S32.

At the step S32, the CPU 70b updates the initial time T0 by storing the current time Tn obtained at the step S27 as the initial time T0 in the memory section 70c.

After the step S32, the CPU 70b sets the constant speed state indicating flag Fl to one at a step S33, and then proceeds to a step S34.

On the other hand, at the step S31, the CPU 70b reads the most recent values of the average front and rear wheel speeds Nfav and Nrav which are updated and stored in the momory section 70c.

At a step S35 following the step S31, the CPU 70b reads the most recent value of the average vehicle speed Vav which is updated and stored in the memory section 70c.

Then, the CPU 70b proceeds from the step S35 to a step S36 to update the averages Nfav, Nrav and Vav. At the step S36, an arithmetic mean of the most recent value of the average front wheel speed Nfav obtained at the step S31 and the value of the sensed front wheel speed Nf obtained at the step S22 is stored as a new value of the average front wheel speed Nfav; an arithmetic mean of the most recent value of the average rear wheel speed Nrav obtained at the step S31 and the value of the sensed rear wheel speed NR obtained at the step S22 is stored as a new value of the average rear wheel speed Nrav; and an arithmetic means of the most recent value of the average vehicle speed Vav obtained at the step S35 and the value of the sensed vehicle speed V obtained at the step S23 is stored as a new value of the average vehicle speed Vav. From the step S36, the CPU 70b proceeds to the step S34.

At the step S34, the CPU 70b determines an elapsed time I by subtracting the updated initial time T0 from the current time Tn read at the step S27 (I=Tn−T0). Then, the CPU 70b proceeds from the step S34 to a step S37.

At the step S37, the CPU 70b determines whether the elapsed time I calculated at the step S34 is smaller than a predetermined time length T1. If I<T1, the CPU 70b returns from the step S37 to the step S22. If I is equal to or greater than T1, then the CPU 70b proceeds from the step S37 to a step S38.

At the step S38, the CPU 70b determines an average front and rear wheel speed difference ΔNav by subtracting the average front wheel speed Nfav which has been updated at the step S36 and stored in the memory section 70c, from the average rear wheel speed Nrav which has been updated at the step S36 and stored in the memory section 70c (ΔNav=Nrav−Nfav).

Then, the CPU 70b determines whether the average front and rear wheel speed difference ΔNav calculated at the step S38 is negative or not. From the step S39, the CPU 70b proceeds to a step S40 if the average speed difference ΔNav is smaller than zero; and proceeds to a step S41 if it is not.

At the step S40, the CPU 70b reads the most recent value of the vehicle characteristic parameter A updated and stored in the memory section 70c. From the step S40, the CPU 70b proceeds to the step S28.

At the step S41, the CPU 70b determines the vehicle characteristic parameter A according to the following equation (10) by using the average front and rear wheel speed difference ΔNav calculated at the step S38 and the most recent average vehicle speed Vav updated at the step S36 and stored in the memory section 70c.

$$A = \Delta Nav/(Vav)^3 \tag{10}$$

Then, the CPU 70b proceeds from the step S41 to a step S42, at which the CPU 70b updates the vehicle parameter A stored in the memory section 70c by storing the new value of the vehicle parameter A determined at the step S41. From the step S42, the CPU 70b proceeds to the step S28.

At the step S28, the constant speed state indicating flag Fl is reset to zero.

At a step S43 immediately subsequent to the step S28, the CPU 70b determines the offset quantity L by multiplying the third power of the vehicle speed V read at the step S23, by the vehicle parameter A which has been calculated at the step S41, or read at the step S40, or made equal to zero at the step S26. In this example, the offset quantity L consists only of the cubic term L1, that is, $L = A \cdot V^3$.

Then, the CPU 70b proceeds from the step S43 to a step S44, and determines, at the step S44, the front and rear wheel speed difference ΔN according to the equation (1) by using the sensed front and rear wheel speeds Nf and Nr read at the step S22.

At a step S45, the CPU 70b determines the front wheel driving torque control magnitude T according to the equation (6) by using the front and rear wheel speed difference ΔN calculated at the step S44 and the offset quantity L calculated at the step S43.

At a step S46, the microcomputer 70 delivers the control signal St representing the control magnitude T to the driver circuit 59, and then returns to a main program.

The control system according to the second embodiment is operated substantially in the same manner as the control system according to the first embodiment. In the control system of the second embodiment, however, the vehicle parameter A is updated in the following manner.

When the vehicle is in a constant speed operation on a high mu road surface such as a dry concrete pavement where the running resistance is considered to be low, the difference between the average front wheel speed Nfav and average rear wheel speed Nrav which are obtained at the steps S22–S37 over the time interval T1 remains low regardless of the level of the vehicle speed V. That is, the slip of the rear wheels 2RL and 2RR is small, and the difference of each of the average front and rear wheel speeds Nfav and Nrav from the average vehicle speed Vav is small. Since ΔNav determined at the step S38 is small, the vehicle parameter A calculated at the step S41 decreases as the average vehicle speed V increases. Therefore, the offset quantity L calculated at the step S43 is relatively small, and the control system starts increasing the driving torque to the front wheels earlier with the relatively narrow dead band. By so doing, the control system can improve the driving stability by quickly eliminating the slip of the primary drive wheels in the constant speed operation.

When the vehicle is in a constant speed operation on a very low friction surface such as a snow-clad or iced road surface where the running resistance is considered to be very high, the primary drive rear wheels 2RL and 2RR are almost always slipping, and the average rear wheel speed Nrav deviates considerably from each of the average front wheel speed Nfav and the average vehicle speed Vav. Therefore, ΔNav of the step S38 becomes high, the vehicle parameter A of the step S41 becomes relatively great, and the offset quantity L becomes relatively great. As a result, the control system postpones increasing the driving torque to the front wheels until the relatively wide dead band determined by the offset quantity L is exceeded, and by so doing improves the fuel economy. In the dead band, the vehicle can continue the constant speed operation stably with the rear wheels slipping to some degree.

When the vehicle is accelerated, the longitudinal acceleration Xg readily exceeds the threshold value B which is set as low as 0.1 G, and the offset quantity L is immediately reduced to zero at the steps S26 and S43. As a result, the control system increases the driving torque to the front wheels immediately in response to the front and rear wheel speed difference ΔN in a real time manner, and provides a stable accelerating operation.

When the vehicle is going down a slope in a constant speed state and the rear wheels are almost free from slippage under the influence of the acceleration of gravity, the average wheel speed difference ΔNav of the step S38 is small, the vehicle parameter A of the step S41 decreases with increase in the average vehicle speed, and the offset quantity L of the step S43 is relatively small. With the small offset quantity L, the control system can improve the driving stability of the vehicle by increasing the driving force to the front wheels promptly in response to the front and rear wheel speed difference ΔN.

When the vehicle is going up a slope at a constant speed, and the rear wheels tend to slip under the influence of the acceleration of gravity, the average wheel speed difference ΔNav increases, the vehicle parameter A of the step S41 becomes relatively great, and the control system makes the dead band relatively wide with the relatively great offset quantity L, and improves the fuel economy. In this uphill operation, the driver tends to depress the acceleration pedal deeply and rapidly, and the rear wheels tend to slip. In this case, however, the control system reduces the offset quantity L to zero immediately when the longitudinal acceleration reaches 0.1 G, and provides a stable acceleration performance.

In calculating the vehicle parameter A, errors in wheel speed due to a difference between an actual tire diameter and an initially set tire diameter are contained in the average wheel speeds Nfav and Nrav, and the vehicle parameter A is determined from the average wheel speed difference between these average wheel speeds and the average vehicle speed.

Therefore, the control system of the second embodiment can adequately determine the offset quantity L only from the cubic term without calculating the linear term L2.

In the second embodiment, the steps S21–S24, and S26–S40 correspond to the learning process or the learning means, the threshold (0.1 G) of the longitudinal acceleration is lower than that (0.2 G) of the first embodiment, and the second offset term L2 is considered to be contained in the average front and rear wheel speed difference ΔNav and neglected. The step S25 corresponds to the constant speed state detecting means, and the step S43 corresponds to the modifying means. The steps S30 and S36 correspond to an average updating means, and the steps S41 and S42 correspond to a parameter updating means.

In the first and second embodiments, the offset quantity L is dependent on the vehicle speed V. However, it is possible to employ the longitudinal acceleration of the vehicle, the front and rear wheel speed difference, the derivative of the front and rear wheel speed difference, or the acceleration of the primary wheels, in place of the vehicle speed V, and to calculate the offset quantity L by substituting one of these variables for the vehicle speed in the mathematical relationship in the step S5 of FIG. 6 or S43 of FIG. 7 with the coefficient adjusted appropriately. Furthermore, it is possible to use any of these variables to detect the constant speed state instead of the longitudinal acceleration.

The present invention is applicable to the four wheel drive vehicle in which the front wheels are primary drive wheels, and the rear wheels are secondary drive wheels connected through a transfer clutch with the engine. In this case, the front and rear wheel speed difference ΔN is given by ΔN=Nf−Nr.

As the transfer clutch, it is possible to employ various clutches as long as they can vary a driving torque transmitted therethrough continuously in response to a control signal.

The controller 58 can be constructed in various manners. Instead of the microcomputer, the controller 58 can be made up of an analog or digital electronic circuit comprising one or more counters, and one or more comparators.

The before-mentioned U.S. Pat. Nos. 5,060,747 and 4,986,388 show driving torque distribution control characteristics having dead bands somewhat similar to the dead band L according to the present invention. However, the dead band of the latter patent is on the negative side where the front and rear wheel speed difference is negative, and the running resistance is not taken into account in both.

What is claimed is:

1. A driving torque distribution control system for a vehicle, comprising:

a drive system for distributing a driving torque from a prime mover of the vehicle between a primary drive axle and a secondary drive axle of the vehicle, said drive system comprising an actuator for varying a driving torque distribution ratio between the primary drive axle and the secondary drive axle in response to a control signal;

first sensing means for determining a wheel speed difference between a primary drive wheel speed of the primary drive axle and a secondary drive wheel speed of the secondary drive axle;

second sensing means for detecting a constant speed running state of the vehicle, the second sensing means comprising a vehicle condition sensor for sensing a vehicle operating condition, wherein the second sensing means detects the constant speed running state in accordance with the sensed vehicle operating condition; and controlling means for receiving the wheel speed difference as an input signal from the first sensing means, for producing the control signal for the actuator in response to the input signal in accordance with one of a normal control characteristic and a modified control characteristic, and for selecting one of the normal and modified control characteristics in response to a condition signal supplied from the second sensing means, wherein in the modified control characteristic a share of the driving torque to the secondary drive axle is decreased, with respect to the normal control characteristic, wherein said second sensing means includes a means for producing the condition signal which is in a first signal state when the vehicle is accelerated during a straight ahead operation, and in a second signal state when said constant speed running state is detected during straight ahead operation of the vehicle, and said controlling means produces said control signal according to said normal control characteristic when said condition signal is in said first signal state, and according to said modified control characteristic when said condition signal is in said second signal state, and wherein a magnitude of said control signal is increased to increase the share of the driving torque to the secondary drive axle as the wheel speed difference increases, and a rate of increase of the magnitude of said control signal with respect to said wheel speed difference is smaller in said modified control characteristic than in at least a portion of said normal control characteristic.

2. A control system according to claim 1, wherein the controlling means comprises a control characteristic modifying means for determining a modification quantity in accordance with the vehicle operating condition sensed by the vehicle condition sensor, and for modifying the normal control characteristic in accordance with the modification quantity to provide the modified control characteristic.

3. A control system according to claim 2, wherein the vehicle operating condition sensed by the vehicle condition sensor is one of a vehicle speed, a time rate of change of the vehicle speed, and an operating condition of one of an accelerator system and a brake system of the vehicle for increasing and decreasing a vehicle speed of the vehicle.

4. A control system according to claim 1, wherein the controlling means comprises a control characteristic modifying means for determining a modification quantity, and for modifying the normal control characteristic in accordance with the modification quantity to provide the modified control characteristic, and wherein the controlling means includes a means for holding the control signal at a minimum value when the wheel speed difference is lower than the modification quantity, and increasing the control signal from the minimum value in accordance with the wheel speed difference when the wheel speed difference is higher than the modification quantity.

5. A control system according to claim 4, wherein the vehicle operating condition sensed by the vehicle condition sensor is one of a vehicle speed of the vehicle, a wheel speed, a longitudinal acceleration of the vehicle, a condition of an accelerator system of the vehicle and a condition of brake system of the vehicle.

6. A control system according to claim 4, wherein the vehicle condition sensor is a longitudinal acceleration sensor for sensing a longitudinal acceleration of the vehicle, and the second sensing means includes a means for determining that the constant speed running state exists when the longitudinal acceleration is lower than a predetermined acceleration threshold value.

7. A control system according to claim 1, wherein said rate of increase of the magnitude of said control signal with respect to said wheel speed difference in said modified control characteristic is smaller than that of said normal control characteristic in a low wheel speed difference range in which said wheel speed difference is positive and equal to or smaller than a predetermined threshold, said wheel speed difference being a difference resulting from subtraction of said secondary drive wheel speed from said primary drive wheel speed.

8. A control system according to claim 7, wherein said rate of increase of the magnitude of said control signal with respect to said wheel speed difference in said modified control characteristic is equal to zero in said low wheel speed difference range.

9. A control system according to claim 1, wherein said controlling means comprises a control signal generating means for producing said control signal according to said one of the normal control characteristic and the modified control characteristic, and for holding the magnitude of said control signal equal to or lower than a predetermined control level until said wheel speed difference exceeds a predetermined wheel speed difference threshold, and a control characteristics modifying means for increasing said predetermined wheel speed difference threshold when said condition signal is in said second signal state.

10. A control system according to claim 9, wherein said control characteristic modifying means includes a means for determining a modification quantity in accordance with the vehicle operating condition sensed by the vehicle condition sensor so that said modification quantity is increased when a vehicle speed of the vehicle is increased, and for setting said predetermined wheel speed difference threshold equal to said modification quantity when said condition signal is in said second signal state.

11. A driving torque distribution control system for a vehicle, comprising:
   a drive system for distributing a driving torque from a prime mover of the vehicle between a primary drive axle and a secondary drive axle of the vehicle, said drive system comprising an actuator for varying a driving torque distribution ratio between the primary drive axle and the secondary drive axle in response to a control signal;
   first sensing means for determining a wheel speed difference between a primary drive wheel speed of the primary drive axle and a secondary drive wheel speed of the secondary drive axle;
   second sensing means for detecting a constant speed running state of the vehicle, the second sensing means comprising a vehicle condition sensor for sensing a vehicle operating condition to detect the constant speed running state of the vehicle, and a constant speed running condition detecting means for detecting the constant speed running condition in accordance with the vehicle operating condition;
   controlling means for receiving the wheel speed difference as an input signal from the first sensing means, producing the control signal for the actuator in response to the input signal by using a predetermined control characteristic between the control signal and the input signal, and modifying the predetermined control characteristic to decrease a share of a driving torque to the secondary drive axle when the constant speed running state is detected, the controlling means comprising a control characteristic modifying means for determining a modification quantity, and for modifying the predetermined control characteristic in accordance with the modification quantity, and a means for holding the control signal at a minimum value when the wheel speed difference is lower than the modification quantity, and increasing the control signal from the minimum value in accordance with the wheel speed difference when the wheel speed difference is higher than the modification quantity,
   wherein the vehicle condition sensor is a longitudinal acceleration sensor for sensing a longitudinal acceleration of the vehicle, and the constant speed running condition detecting means includes a means for determining that the constant speed running state exists when the longitudinal acceleration is lower than a predetermined acceleration threshold value; and
   a vehicle speed sensor for sensing a vehicle speed of the vehicle, and the control characteristic modifying means having a means for determining the modification quantity which comprises a cubic term proportional to the third power of the vehicle speed.

12. A control system according to claim 11 wherein the modification quantity is equal to a sum of the cubic term and a linear term proportional to the vehicle speed.

13. A control system according to claim 12 wherein the controlling means comprises a means for determining a control magnitude which is equal to a product obtained by multiplying a difference resulting from subtraction of the modification quantity from the wheel speed difference, by a control gain, and the modifying means includes a means for determining a basic offset quantity which is equal to a sum of the cubic term and the linear term, and making the modification quantity equal to the basic offset quantity when the longitudinal acceleration is equal to or lower than the predetermined acceleration threshold value, and equal to zero when the longitudinal acceleration is higher than the acceleration threshold value.

14. A control system according to claim 11 wherein the controlling means comprises a means for determining a control magnitude which is equal to a product obtained by multiplying a difference resulting from subtraction of the modification quantity from the wheel speed difference, by a control gain, wherein the modification quantity is equal to a product obtained by multiplying the third power of the vehicle speed by a predetermined first parameter, and wherein the modifying means comprises a learning means for determining the parameter by dividing an average wheel speed difference by the third power of an average vehicle speed while the longitudinal acceleration remains equal to or lower than the acceleration threshold value.

15. A control system according to claim 14 wherein the learning means comprise an average updating means for updating the average vehicle speed, an average primary wheel speed and an average secondary wheel speed while the longitudinal acceleration is equal to or lower than the threshold value, and a parameter updating means for updating the parameter by dividing the average wheel speed difference obtained by subtracting the average secondary wheel speed from the average primary wheel speed, by the third power of the average vehicle speed while the longitudinal acceleration remains equal to or lower than the threshold value.

16. A control system according to claim 11 wherein the drive system comprises a transfer comprising an input shaft connected with the prime mover, a first output shaft which is always connected with the input shaft, and further connected with the primary drive axle for driving primary drive wheels, and a second output shaft connected with the secondary drive axle for secondary drive wheels, and the actuator comprises a transfer clutch which is disposed between the second output shaft of the transfer and the input shaft of the transfer and which increases a clutch engagement force of the transfer clutch continuously from a fully disengaged state to a fully engaged state as the control signal increases.

17. A control system according to claim 16 wherein the primary drive wheels are left and right rear wheels of the vehicle, and the secondary drive wheels are left and right front wheels of the vehicle.

18. A vehicle comprising:
   an engine;
   a pair of primary drive wheels, and a pair of secondary drive wheels;
   a drive system for transmitting a driving torque from the engine to the primary drive wheels and the secondary drive wheels, the drive system comprising a transfer comprising a transfer input member for receiving a driving torque from the engine, a first output member for driving the primary drive wheels, a second output member for driving the secondary drive wheels, and a transfer clutch disposed between the transfer input member and the second output member, the first output member being always drivingly connected with the transfer input member, the second output member being connected with the transfer input member through the transfer clutch;

an actuator for varying a clutch engagement force of the transfer clutch in response to a control signal;

a sensor group for determining a primary wheel speed of the primary drive wheels, a secondary wheel speed of the secondary drive wheels, and a vehicle speed of the vehicle; and a controller for determining a wheel speed difference by subtracting the secondary wheel speed from the primary wheel speed, determining an offset quantity which is zero when the vehicle is out of a predetermined running state in which a time rate of change of the vehicle speed is equal to or lower than a predetermined threshold, and which is set equal to a quantity comprising a cubic term proportional to a third power of the vehicle speed when the vehicle is in the predetermined running state, determining a control magnitude which is a product obtained by multiplying, by a predetermined control gain, a difference resulting from subtraction of the offset quantity from the wheel speed difference, and producing the control signal representing the control magnitude.

19. A vehicle according to claim 18 wherein the vehicle further comprises a vehicle speed operating system for increasing and decreasing a vehicle speed of the vehicle, the vehicle speed operating system comprising an accelerator system for varying a vehicle speed of the vehicle by varying a supply of fuel to the engine, and a brake system for decreasing the vehicle speed; the sensor group comprises a first sensor for sensing the primary wheel speed, a second sensor for sensing the secondary wheel speed, a third sensor for sensing the vehicle speed, and a fourth sensor for sensing a vehicle operating condition which is one of a longitudinal acceleration of the vehicle, and a condition in the vehicle speed operating system; and the controller comprises a detecting means for monitoring an output signal of the fourth sensor to determine whether the predetermined running state exists.

20. A driving torque distribution control system for a vehicle, comprising:

a drive system for shifting a driving torque from a prime mover of the vehicle between a primary drive axle and a secondary drive axle of the vehicle in response to a control signal;

a constant speed detector for detecting a constant speed, straight ahead running state of the vehicle and for discriminating between the constant speed, straight ahead running state and an acceleration, straight ahead running state of the vehicle;

a controller for providing the control signal to the drive system, wherein the controller is configured to operate in one of a normal mode and a modified mode, and wherein a rate of shifting the driving torque to the primary drive axle from the secondary drive axle is greater in the modified mode than in the normal mode, and wherein the controller is configured to enter the modified mode in response to the constant speed detector detecting the constant speed, straight ahead running state, thereby improving a fuel economy of the vehicle; and a wheel speed difference sensor for sensing a wheel speed difference between a first wheel speed corresponding to primary drive wheels and a second wheel speed corresponding to secondary drive wheels, wherein, in the normal mode, the controller is configured to provide the control signal in accordance with a predetermined control characteristic based on the wheel speed difference, wherein, in the modified mode, the controller is configured to shift the predetermined control characteristic by an offset quantity in response to the constant speed detector detecting the constant speed, straight ahead running state, and wherein the offset quantity defines a dead band in which the controller increases the rate of shifting the driving torque to the primary drive axle from the secondary drive axle.

21. A control system according to claim 20, wherein the offset quantity is determined in accordance with a third power of the vehicle speed.

22. A control system according to claim 20, wherein the controller is configured to determine the offset quantity without regard to yaw rate of the vehicle.

23. A control system according to claim 20, wherein the controller is configured to determine the offset quantity only in accordance with a speed of the vehicle.

24. A control system according to claim 20, wherein the controller is configured to determine the offset quantity only in accordance with a speed of the vehicle and the wheel speed difference.

25. A method of controlling a vehicle, comprising the steps of:
(A) providing a drive system for distributing a driving torque from a prime mover of the vehicle between a primary drive axle and a secondary drive axle of the vehicle in response to a control signal;
(B) determining a wheel speed difference in accordance with a first wheel speed of primary drive wheels and a second wheel speed of secondary drive wheels;
(C) determining whether the vehicle is in one of a constant speed, straight ahead running state or an acceleration, straight ahead running state;
(D) determining an offset quantity in accordance with a first coefficient if the vehicle is determined to be in the constant speed, straight ahead running state and in accordance with a second coefficient if the vehicle is determined to be in the acceleration, straight ahead running state; and
(E) providing the control signal to distribute the driving torque in accordance with the offset quantity and the wheel speed difference,
wherein, in step (D), said first coefficient is one and said second coefficient is zero, and wherein the offset quantity is determined in accordance with a product of one of the first coefficient and the second coefficient, thereby defining a dead band in which the driving torque is fully shifted to the primary drive axle to improve a fuel economy of the vehicle.

26. A method of controlling a vehicle, comprising the steps of:
(A) providing a drive system for distributing a driving torque from a prime mover of the vehicle between a primary drive axle and a secondary drive axle of the vehicle in response to a control signal;
(B) determining a wheel speed difference in accordance with a first wheel speed of primary drive wheels and a second wheel speed of secondary drive wheels;
(C) determining whether the vehicle is in one of a constant speed, straight ahead running state or an acceleration, straight ahead running state;

(D) determining an offset quantity in accordance with a first coefficient if the vehicle is determined to be in the constant speed, straight ahead running state and in accordance with a second coefficient if the vehicle is determined to be in the acceleration, straight ahead running state; and (E) providing the control signal to distribute the driving torque in accordance with the offset quantity and the wheel speed difference, wherein, in step (D), the offset quantity is determined in accordance with a third power of the vehicle speed.

27. A vehicle comprising:

an engine;

a pair of primary drive wheels and a pair of secondary drive wheels;

a drive system for transmitting a driving torque from the engine to the primary drive wheels and the secondary drive wheels, the drive system having a transfer including a transfer input member for receiving a driving torque from the engine, a first output member for driving the primary drive wheels, a second output member for driving the secondary drive wheels, and a transfer clutch disposed between the transfer input member and the second output member, the first output member being always drivingly connected with the transfer input member, the second output member being connected with the transfer input member through the transfer clutch;

an actuator for varying a clutch engagement force of the transfer clutch in response to a control output signal;

a first sensor for sensing a first vehicle operating condition representing a primary drive wheel speed of the primary drive wheels;

a second sensor for sensing a second vehicle operating condition representing a secondary drive wheel speed of the secondary drive wheels;

a third sensor for collecting information on a longitudinal movement of the vehicle by sensing at least one third vehicle operating condition indicative of the longitudinal movement of the vehicle;

a controller for producing a control input signal representing a wheel speed difference between the secondary drive wheel speed and the primary drive wheel speed in response to signals supplied from the first and second sensors, for detecting a constant speed running state by monitoring the information supplied from the third sensor, for producing a constant speed condition signal when the constant speed running state is detected, for producing the control output signal representing the clutch engagement force of the transfer clutch in response to the control input signal in accordance with a control characteristic for increasing the clutch engagement force with increase in the wheel speed difference, and for decreasing the clutch engagement force in response to the constant speed condition signal by shifting the control characteristic by an offset quantity which is independent of a lateral acceleration of the vehicle.

28. A vehicle according to claim 27, wherein the controller determines, from the information supplied from the third sensor, a vehicle operating variable representing a longitudinal vehicle speed of the vehicle, and increases the offset quantity in accordance with the vehicle operating variable so that the offset quantity is increased above zero when the vehicle is moving straight ahead.

* * * * *